US012524935B2

United States Patent
Wu (10) Patent No.: US 12,524,935 B2
(45) Date of Patent: Jan. 13, 2026

(54) SYSTEM AND METHOD FOR CHARACTERIZING THE MULTI-LEVEL PAM EYE DIAGRAM

(71) Applicant: Donghong Wu, Union City, CA (US)

(72) Inventor: Donghong Wu, Union City, CA (US)

(*) Notice: Subject to any disclaimer, the term of this patent is extended or adjusted under 35 U.S.C. 154(b) by 399 days.

(21) Appl. No.: 18/167,745

(22) Filed: Feb. 10, 2023

(65) Prior Publication Data

US 2024/0273788 A1 Aug. 15, 2024

(51) Int. Cl.
*G06T 11/20* (2006.01)
*H04L 27/02* (2006.01)

(52) U.S. Cl.
CPC ......... *G06T 11/206* (2013.01); *G06T 11/203* (2013.01); *G06T 2210/21* (2013.01); *H04L 27/02* (2013.01)

(58) Field of Classification Search
None
See application file for complete search history.

(56) References Cited

U.S. PATENT DOCUMENTS

| 10,454,725 | B1* | 10/2019 | Lee | H04L 25/4917 |
| 2016/0310060 | A1* | 10/2016 | Li | A61B 3/14 |
| 2021/0175968 | A1* | 6/2021 | Wu | H04B 10/0799 |
| 2022/0247648 | A1* | 8/2022 | Pickerd | H04L 1/242 |
| 2023/0054834 | A1* | 2/2023 | Manjunath | H04L 25/4917 |

* cited by examiner

Primary Examiner — Miya J Cato (57) ABSTRACT

A software system and method are disclosed for characterizing multi-level Pulse Amplitude Modulation (PAMn) eye diagrams using integrated image processing, curve fitting, and statistical analysis. The system processes a photograph or digital file of a PAMn eye diagram, typically captured from a digital sampling oscilloscope, and converts it into a one unit interval (1UI) PAMn pattern. In this pattern, horizontal lanes and transition lane center curves are sampled and fitted to extract the mean and width of each lane. Two 1UI PAMn patterns are then combined to reconstruct a two unit interval (2UI) PAMn eye diagram with statistical features. The system calculates eye heights and eye widths for each eye based on the extracted lane statistics parameters and enables mask testing by aligning a predefined test mask with the center of each eye region to evaluate compliance.

6 Claims, 12 Drawing Sheets

SYSTEM AND METHOD FOR CHARACTERIZING THE MULTI-LEVEL PAM EYE DIAGRAM

CROSS-REFERENCE TO RELATED APPLICATIONS

This application is related to U.S. patent application Ser. No. 18/146,876, filed on Dec. 27, 2022, entitled "Jitter Measurement in Multi-Level PAM Eye Diagrams." Although both applications relate to analysis of PAMn signals, the present application is directed to eye diagram characterization and does not claim priority to the earlier application.

FIELD OF TECHNOLOGY

The invention relates to a signal analysis method in serial communication. More particularly, the invention relates to a system and method for characterizing a multi-level PAM Eye Diagram in high-speed serial communication.

BACKGROUND OF THE INVENTION

In fiber optic networks, data is sent via an optical fiber in the form of light pulses to keep data traveling at very high speeds across long distances. Multi-level pulse amplitude modulation (PAMn), called serial communications, is a form of signal modulation where message information is encoded in the amplitude of a series of signal pulses. A conventional modulation in serial communication is binary non-return to zero (NRZ), or PAM2, which has two levels to represent logic 0 and logic 1. Because of the higher channel-dependent loss of NRZ modulation, PAMn (wherein n>2), specifically PAM4, has become a more usable solution in the high-speed communication network to increase bandwidth. PAM4 uses 4-level signaling and may transmit two bits per unit interval, using half the bandwidth compared to NRZ coding. Although there are increases in the PAM4 standards in the high-speed interconnector industry, the characterization of the PAM4 products is still challenging when using the traditional testing methodology for NRZ signals.

When a series of optical or electrical signals with a standard test pattern is sent to a transceiver, output signals of the device under test (DUT) are received on the Digital Communications Analyzer (DCA) and processed to create the eye diagram or eye pattern on the screen. Eye diagram analysis plays a crucial role in characterizing optical and electrical signals in high-speed serial communication because it allows various features of signals, including quality and statistical information, to be quickly visualized and determined. An NRZ eye diagram with one eye may be effectively characterized with the measurement of the eye diagram and the eye mask test method. However, significant challenges exist in characterizing a PAMn (n>2) eye diagram when applying the eye mask test method. Unlike NRZ, a PAMn (n>2) signal may have, for example, more eyes of varying asymmetry, smaller eye openings, and complicated transition structures. Those factors may result in difficulty in defining the geometric details of the eyes and characterizing the PAMn eye diagram.

In the existing testing solutions of the PAM4 eye diagram, the eye height (EH6) and eye width (EW6) may be the two most important parameters. However, both parameters, EH6 and EW6, may only be tested and determined by concurrently running an additional test procedure on a receiver (Rx) to produce bathtub curves at a bit error rate (BER) of 10E-6, so the testing is a time and equipment extensive test procedure. To characterize the complex structure of the PAMn eye diagram, more than the parameters EH6 and EW6 are needed. In addition, the mask method well-used in NRZ testing cannot be used in the PAMn testing even after EH6 and EW6 are determined. Therefore, there is a great need to find a generic solution for characterizing the PAMn eye diagram.

The present disclosure is a software system that integrates image processing methods, curve fitting, and statistical analysis to characterize the PAMn eye diagram in a photo or a digital file from the screen of the DCA or oscilloscope. The system first edits the eye diagram to be an image or pattern with one unit interval (1UI) in width and performs the curve fitting for the center lines of all transition lanes in the 1UI PAMn pattern. After that, the system may generate a 2UI PAMn eye diagram again by combining two processed 1UI PAMn patterns. With the statistical data, the means, and widths of the transition lanes at different sampling points, the system may determine the eye heights (EH) and eye widths (EW) of eyes and other geometrical parameters in the PAMn eye diagram. Furthermore, the system may perform mask testing by locating the mask against the center of each eye. Because the algorithms are based on the statistical model, curve fitting, and image processing method, the software solution in the disclosure may characterize the general PAMn eye diagram besides the NRZ signaling in the existing testing solutions. Notably, the software system may be a powerful analysis tool for R&D, production, and services on high-speed serial communication.

BRIEF DESCRIPTION OF DRAWINGS

The present invention is illustrated by way of example, and not by way of limitation, in the figures of the accompanying drawings and in which reference numerals refer to similar elements.

The following terms may be used with reference to the figures and description set forth herein. A UI may be a unit interval on the x scale of an oscilloscope, which may be converted to a millisecond (ms) or picosecond (ps) on time scales. UI may be used in data analysis to achieve the same scale eye diagrams for signals with different data rates. A PAMn eye diagram may be an image or pattern with 2UI or more in the x scale. A 1UI PAMn pattern may be a pattern with a 1UI width containing all unique transition lanes. A transition lane in the 1UI PAMn pattern may be an imaging band comprising many image dots from the same transition process from a Start to an End level (Start End). A level may be a concentrated layer at the center of the 2UI PAMn eye diagram or on either end of the 1UI PAMn pattern, labeled with the logic coding state from zero to n−1, where n is the multi-level. A level signal may be a mixed-lane signal sampled by a user at either side of the level in the 1UI PAMn pattern. A level histogram may be a pixel profile on the y-axis at the sampling point. A level data may be the mean and width of the level signal. A hlane may be a horizontal lane with the same start and end levels in the 1UI PAMn pattern. A hlane signal may be a single-lane signal sampled in the midpoint of the level. A hlane histogram may be a pixel profile on the y-axis at the sampling point. A hlane data may be the mean and width of the hlane histogram. A tlane may be a transition lane with different start and end levels in the 1UI PAMn pattern. A tlane signal may be a single-lane signal sampled on the curving central line of a tlane. A tlane histogram may be a pixel profile on the cross-section at the sampling point. A tlane width may be the width of the cross-section of the tlane. A tlane data may be the mean and width of the tlane histogram. An EH is the eye height, and an EW is the eye width in the 2UI PAMn eye diagram. An EO is the eye-opening representation of either EH or EW in the dual-lane model. An inner lane may be a tlane or hlane close to the eye center in a particular direction among tlanes. There are six or less inner lanes around the center of an eye. An inner edge may be the tlane or hlane edge close to the eye center.

FIG. 6A-6B illustrates exemplary visual representations for eye openings, wherein

DETAILED DESCRIPTION OF THE INVENTION

Embodiments of methods for characterizing the PAMn eye diagram are described herein. In the following description, some specific details are set forth to provide a thorough understanding of the embodiments of the invention. The particular models, algorithms, and process logic flows in the invention can be combined in any suitable manner into one or more embodiments.

The novel analysis method to characterize the PAMn eye diagram in the present disclosure can be divided into two stages, the 1UI PAMn pattern and the 2UI PAMn eye diagram. Using the 1UI model may simplify the complexity of the PAMn signals and reduce the number of transition lanes analyzed in a PAMn eye diagram to half. Specifically, the 1UI model allows one to focus the curve fitting of a transition lane, either hlane or tlane, on two statistical parameters, the center line or mean and the standard deviation or width. After fitting the transition lanes in the 1UI PAMn pattern, the system may generate the 2UI PAMn eye diagram that includes the statistical parameters of all transition lanes. Therefore, the system may determine the EH and EW of the eyes with the statistical parameters at the different points and further perform mask testing by locating the mask against the center of each eye.

Figure 1:
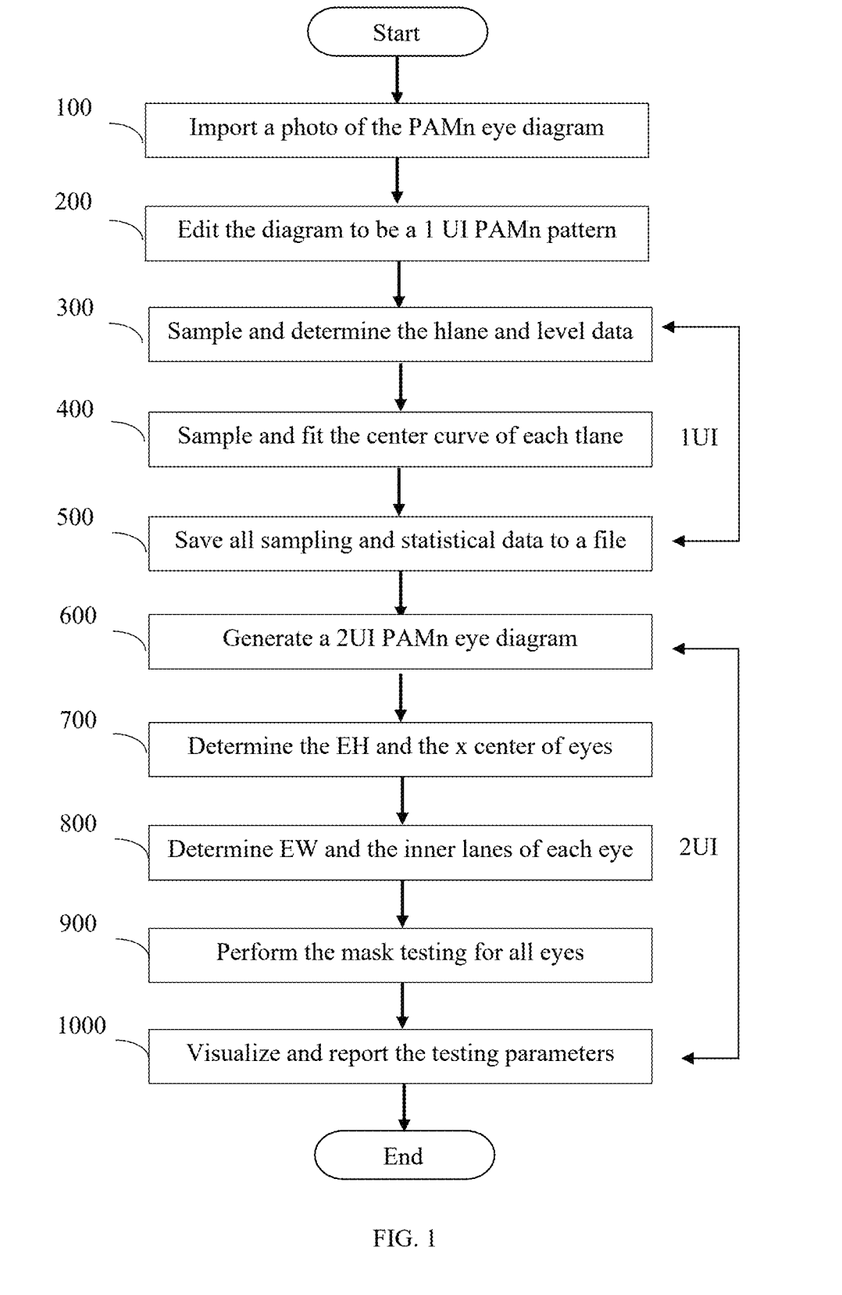
FIG. 1 illustrates a flow chart of an exemplary method for characterizing the PAMn eye diagram with the image process method, curve fitting, and statistical analysis, in accordance with an embodiment of the present invention.

FIG. 1 illustrates a flow chart of an exemplary method for characterizing the PAMn eye diagram with the image process method, curve fitting, and statistical analysis, in accordance with an embodiment of the present invention. In method 100, a system user first imports a color photo or a digital file of the PAMn eye diagram in a 2UI scale or more, taken from the oscilloscope screen, for analysis and characterization. In method 200, the user may edit the PAMn eye diagram as a 1UI PAMn pattern with a monochromatic color by using the image processing method in the system. Thus, the system may analyze each transition lane in the 1UI PAMn pattern. In method 300, the user may sample a hlane signal in the middle of the 1UI image and a level signal at either end of the selected level so that the system may fit the center lines of the hlane and level histograms and determine the statistical data of both hlane and level. In method 400, the user may sample several points along the central lines of a tlane, fit the curves with the logistic function, and determine the tlane mean and width of the cross-section at the midpoint of the tlane in the 1UI PAMn pattern. In method 500, after obtaining the means and widths of all transition lanes, the user may save the testing and statistical data to a file for late uses without fitting again. In method 600, the system may generate a 2UI PAMn eye diagram with the statistical data by combining two 1UI PAMn patterns so that the system may further characterize the 2UI PAMn eye diagram. In method 700, the system may determine the EH of all eyes and the x center of the PAMn eye diagram, and in method 800, determine the EW and the inner lanes for each eye. In method 900, by importing a 2d array mask file and locating the mask against the eye center, the system may perform the mask testing for all eyes in the PAMn eye diagram. Finally, in method 1000, the system may visualize and report the testing parameters of the PAMn eye diagram.

Figure 2:
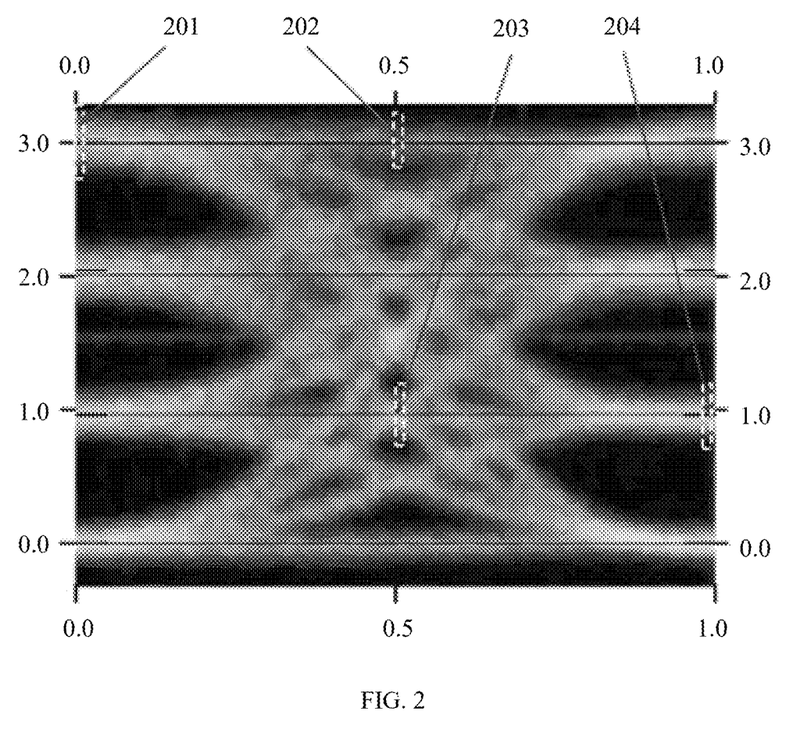
FIG. 2 illustrates an example of sampling the hlane signal and the level signal in a 1UI PAM4 pattern to obtain the hlane and level data.

FIG. 2 illustrates an example of sampling the hlane signal and the level signal in a 1UI PAM4 pattern to obtain the hlane and level data. The user may sample a hlane signal in the middle of a level in the 1UI PAM4 pattern 202 or 203. There are two types of texture structures in the hlane signal area. One is the hlane signal at the top or bottom level in that no other transition lanes are crossing, so the pixel histogram on the y-axis at the sampling point may only contain a single lane signal. Another type is the hlane signals at different levels in that a hlane intersects with some tlanes in the center area of the 1UI PAM4 pattern. In the second case, the user may sample the brightest point in the local area of the hlane signal and set a pixel threshold to filter the background signals of the tlanes, and then acquire the pixel histogram of a hlane signal to get a reasonable hlane width. The user may sample a level signal at either end of level 201 or 204, where the level histogram is the mixed signals of the multiple transition lanes with either the same start level or the same end level. After that, the system may determine the mean and width of the signals at the sampling point by fitting gaussian to its histogram, which means the user doesn't need to find the exact middle point of the signals on the vertical axis. Finally, the system may draw a long horizontal center line with the hlane mean, and two short lines at the two ends with the level mean.

Figure 3:
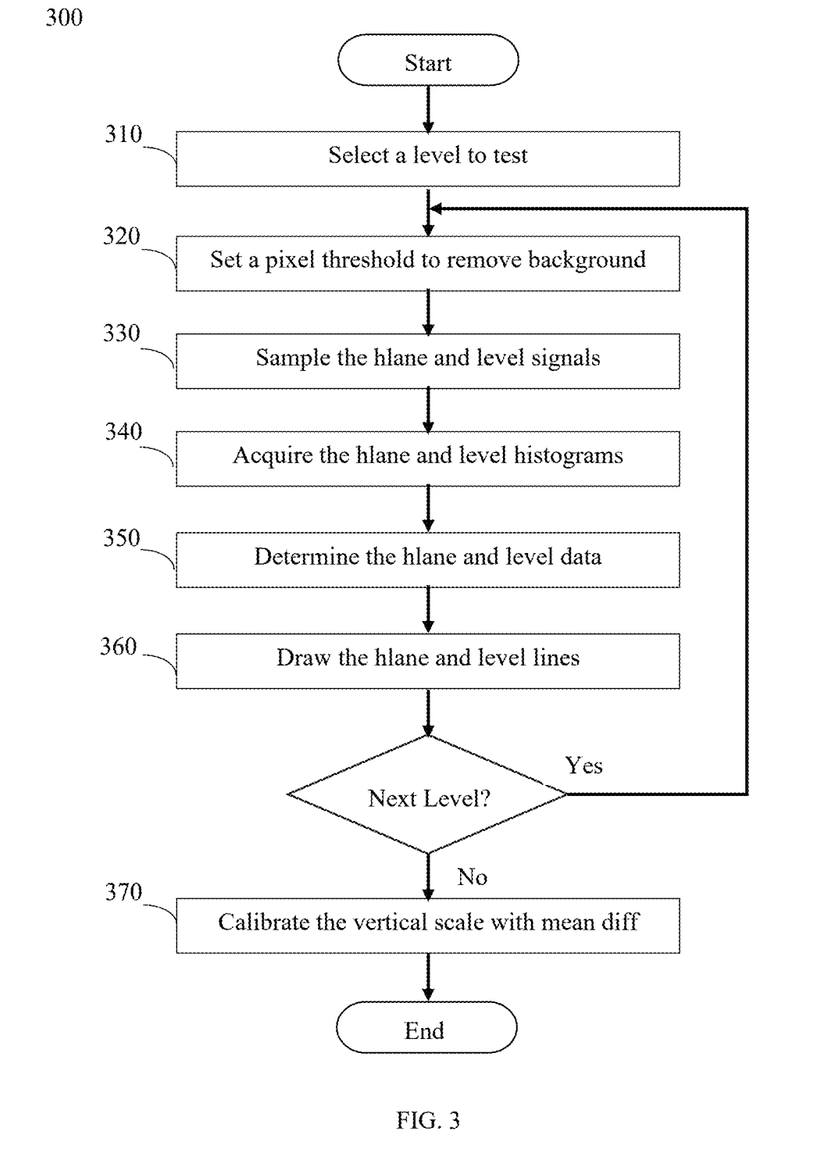
FIG. 3 illustrates a flow chart of an exemplary method for sampling and determining the hlane and level data in the 1UI PAMn pattern, in accordance with an embodiment of the present invention.

FIG. 3 illustrates a flow chart of an exemplary method sampling and determining the hlane and level data in the 1UI PAMn pattern, in accordance with an embodiment of the present invention. When a user selects a level to test in step 310 of method 300, he may set the pixel threshold to filter the background signals in step 320 of method 300. The user may sample the hlane signal in the middle of the level and the level signal at either end of the level in step 330 of method 300. Then the system may acquire the pixel histogram on the vertical axis at the sampling point in step 340 of method 300 and determine the mean and width of the hlane and level signals by fitting gaussian to both histograms in step 350 of method 300. Thus, the system may draw a long horizontal line with the hlane mean, and two short lines at two ends of the level with the level mean in the 1UI PAMn pattern in step 360 of method 300. After obtaining all hlane means, the system may calibrate the vertical scale of the 1UI PAMn pattern by setting the mean difference of the top and bottom hlanes to n−1, where n is the number of levels, in step 370 of method 300.

In a 1UI PAMn pattern, the number of tlanes is n*(n−1). The tlanes can be divided into rise and fall tlanes, identified with the sign of the slope of the curve. The average central line of a tlane has the feature of a monotonous rise or fall curve and an odd symmetrical structure around the midpoint. Therefore, as an example of an embodiment of the invention, the system may use the logistic function, a S-shaped curve, to fit the center curve of a tlane, that is $$f(x)=A+(B-A)/(1+\exp(-k*(x-x_0)))$$

where A is the lower asymptote, B is the upper asymptote, k is the growth rate, and $x_0$ is the midpoint between A and B. Since the midpoint is critical for a curve fitting, the user needs to mark the point $(x_0, y_0)$ close to the vertical center of the tlane when taking the sampling point. The user may select at least 5 points, including the midpoint, to perform the curve fitting because there are four parameters in the logistic function and its symmetrical shape. Another option to get a smooth center curve of a tlane is to connect all sampling points with the cubic spline interpolation method, but it may take more sampling points. Besides fitting the tlane curve, the system also needs to calculate the tlane mean and width of the cross-section at the midpoint of the tlane so that the system may find the edge of a tlane with a different slope used to determine the EW of an eye in the PAMn eye diagram.

Figure 4:
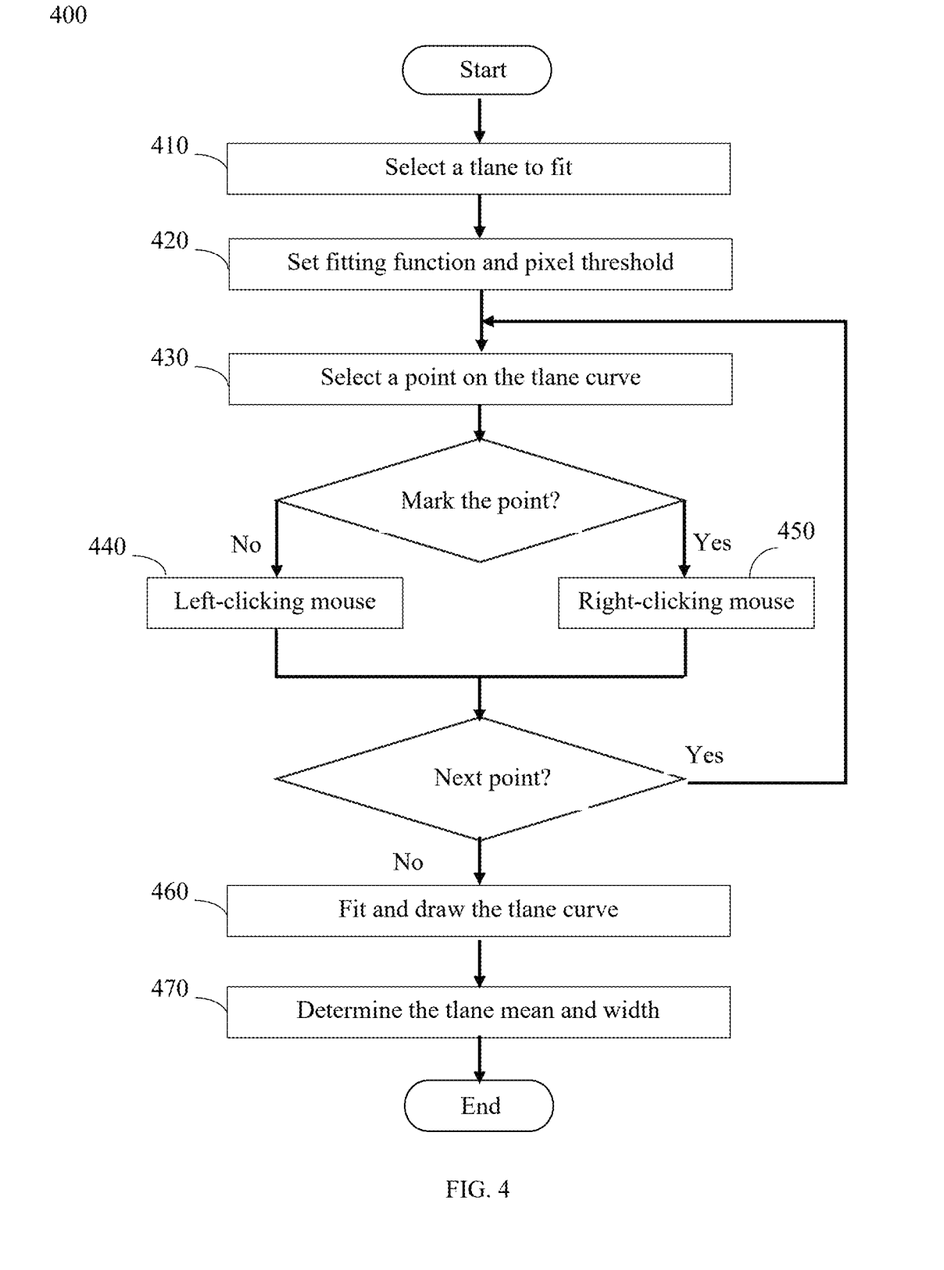
FIG. 4 illustrates a flow chart of an exemplary method for sampling and fitting the central curve of a tlane and determining the tlane width, in the 1UI PAMn pattern, in accordance with an embodiment of the present invention.

FIG. 4 illustrates a flow chart of an exemplary method for sampling and fitting the central curve of a tlane and determining the tlane width, in the 1UI PAMn pattern, in accordance with an embodiment of the present invention. When a user selects a tlane curve to fit in step 410 of method 400, he may first choose the fitting function and set the pixel threshold to reduce the background or signals from other transition lanes in step 420 of method 400. Then the user may select a series of sampling points along the central line of the tlane in step 430 of method 400. He may pick the usual sampling points by left-clicking the mouse in step 440 of method 400 or mark the midpoint by right-clicking the mouse in step 450 of method 400. Thus, the system may fit the tlane curve with the coordinates of all sampling points to determine four parameters in the logistic function, the lower asymptote A and upper asymptote B, the growth rate k, and the midpoint $x_0$ of the tlane curve. With the known parameters of logistic function of the tlane curve, the system may calculate more sampling points and draw a smooth fitting curve of the tlane in step 460 of method 400. In addition, the system may determine the pixel width on the cross-section of the tlane at the midpoint with the growth rate k and trigonometric formula in step 470 of method 400.

Figure 5:
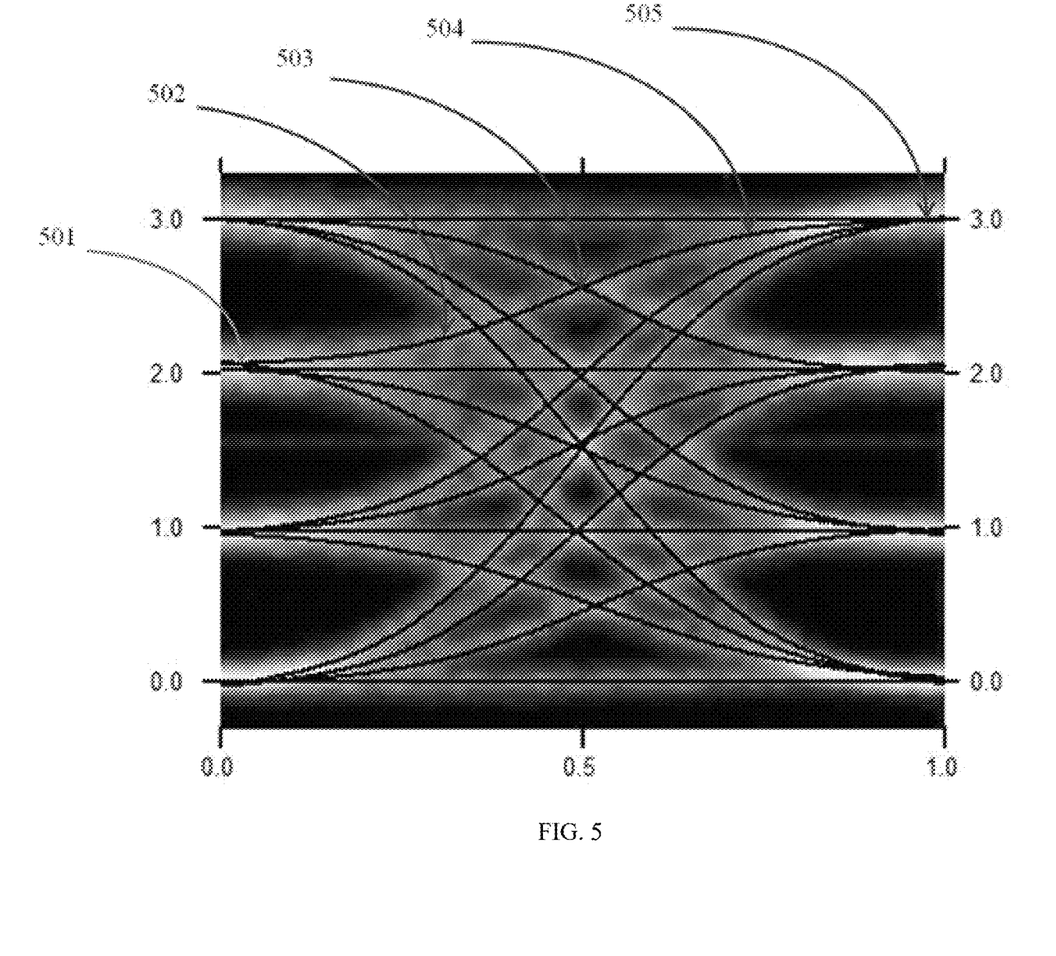
FIG. 5 illustrates an example of sampling the tlane signal along the central line of the tlane (23) in a 1UI PAM4 pattern to obtain the fitting curves of the tlane.

FIG. 5 illustrates an example of sampling the tlane signals along the central line of a tlane in a 1UI PAM4 pattern to obtain a fitting curve of the tlane. Before a user starts to sample the points on a tlane, he may first identify the central line of the tlane, evaluates the best locations to pick up the sampling points, and position the midpoint because a tlane usually overlaps with other hlanes and tlanes. Besides fitting the tlane curve with a logistic function, the system also uses the midpoint to calculate the tlane width on the cross-section of the tlane, so the user may set the pixel threshold to filter the background of other lanes. For example, the user may left-click the mouse for the ordinary points 501, 502, 504, and 505 on the tlane (23) and right-click at 503 for the midpoint, and then the system may complete the curve fitting of the tlane and calculate the tlane mean and width at the midpoint 503 in the 1UI PAM4 pattern.

After the system obtains the curve fitting and the lane widths for all hlanes and tlanes, it may generate a 2UI PAMn eye diagram with all fitting and statistical parameters by combining two 1UI PAMn patterns. Then, the system may further analyze and determine the geometrical parameters of the 2UI PAMn eye diagram based on a dual-lane model in the disclosure.

Figure 6A:
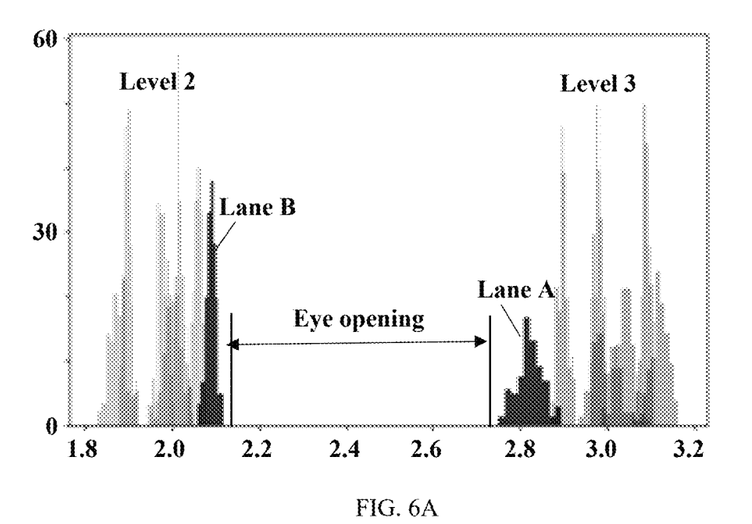
FIG. 6A shows the histograms of two adjacent levels, 2 and 3, on the y-axis.
Figure 6B:
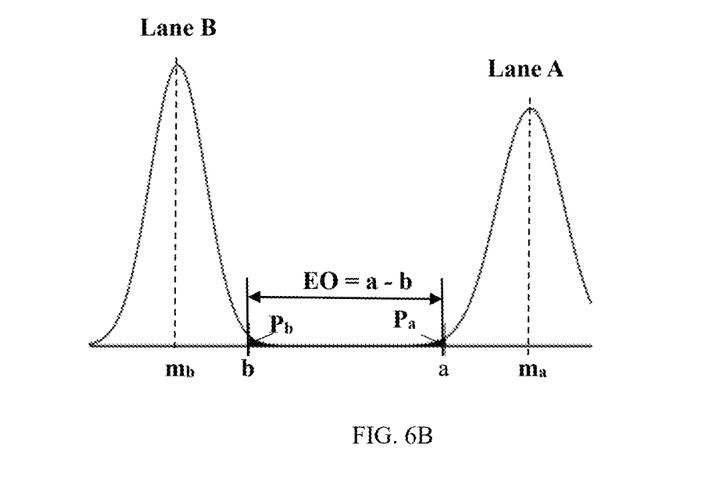
FIG. 6B shows a dual-lane model for determining the EH and EW of the top eye in the PAM4 eye diagram.

FIG. 6A-6B illustrates exemplary visual representations for eye openings, wherein FIG. 6A shows the histograms of two adjacent levels, 2 and 3, on the y-axis in a 1UI PAM4 pattern and FIG. 6B shows a dual-lane model for determining the EH and EW of an eye, in accordance with an embodiment of the present invention. The existing oscilloscope software is to apply a gaussian distribution on the level histogram, regardless of the contribution of the different transition lanes. This approach limits further data analysis of the transition lanes and fails to handle the complicated transition processes in the PAMn eye diagram. In the dual-lane model of the disclosure, the signal intensity of a transition lane at the sampling point is a random variable of a lane rather than a level or a mixed-lane. This approach enables (1) a signal distribution in a transition lane at the scale of the lane rather than at the scale of the level; and (2) signals of different lanes in the same level having different formation mechanisms and distribution profiles, i.e., they are independent of each other. When applying the rules to the histogram analyses of two adjacent levels of an eye in the PAMn eye diagram, one may find that the eye-opening is only related to the two inner lanes close to the center of the eye rather than all lanes in each level, as shown in FIG. 6A. Thus, the problem can be simplified to a dual-lane system, as depicted in FIG. 6B. The derived equation to determine the eye edge is Edge=mean±k*standard deviation, where k is the Z-score for a gaussian distribution or larger for a non-gaussian distribution, and the plus/minus sign is used for the edges of two inner lanes of the eye, respectively. For instance, if the probability of a dual-lane system on PAM4 signals is 10E-6, the Z-score should be 3.09 at the significance level of 0.001 in a one-tailed hypothesis test. Accordingly, one may determine the eye height EH with EH=$(m_a - k*w_a)-(m_b+k*w_b)$, where $m_a$ and $m_b$ are the sample mean of the inner lanes a and b, and $w_a$ and $w_b$ are the widths of the two lanes. However, the formula may work in determining the EW of an eye where the system may identify the eye's inner lanes on the x axis but not the eye's EH on the y-axis.

The level signals are mixed-lane signals where an individual lane may not be separated from others. Therefore, the system may determine the EH of an eye with the level mean and the average width of the tlanes in the level and a large k number more than the Z-score in the EH formula. In the software system, as an embodiment of the present invention, the k number may be a user-defined number that affects the edges of the level histogram and the eye's EH, but nothing about the center of the eye, the latter is more important to run the mask testing.

Defining the x center of the PAMn eye diagram is an issue since the eyes, whose total number is n−1, usually have different vertical centers. The system in the disclosure determines the unique x center of the PAMn eye diagram by finding the eye which has the max EW with the min EH among the eyes in the PAMn eye diagram because (1) the worst case of a parameter should be its spec in the testing and (2) the EH of an eye is usually less than its EW in the PAMn eye diagram.

Figure 7:
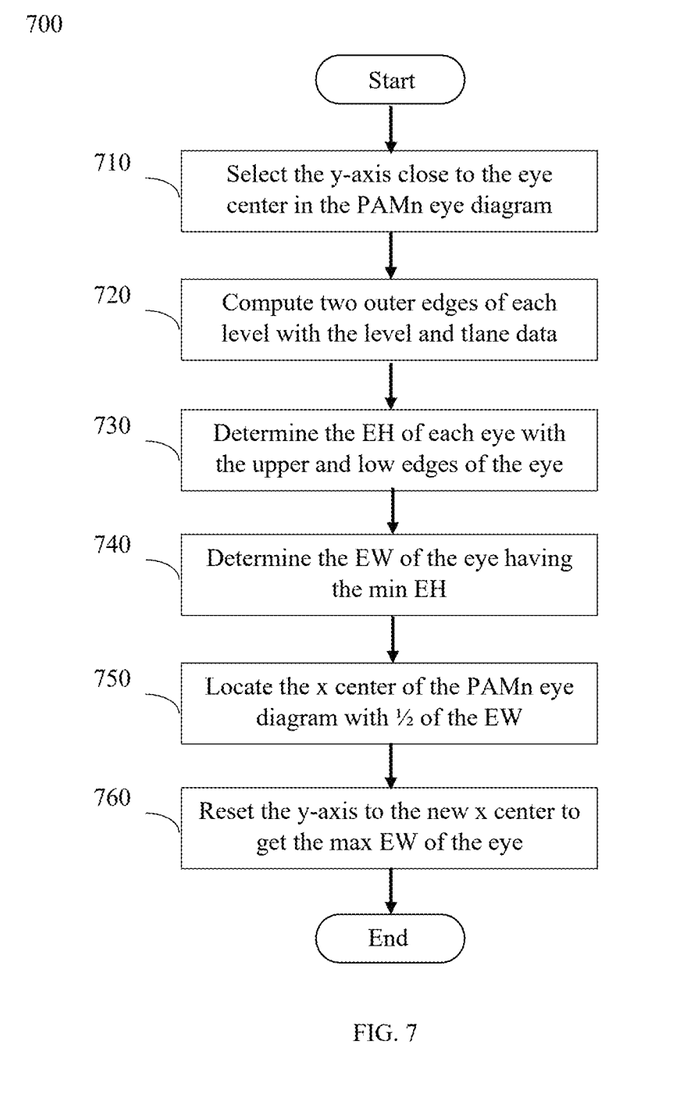
FIG. 7 illustrates a flow chart of an exemplary method for determining the EH of eyes and the x center of the 2UI PAMn eye diagram, in accordance with an embodiment of the present invention.

FIG. 7 illustrates a flow chart of an exemplary method for determining the EH of eyes and the x center of the PAMn eye diagram, in accordance with an embodiment of the present invention. The system user may first select the y-axis close to the center of the PAMn eye diagram as the initial center axis to start a measure of the EH in step 710 of method 700. Based on the dual-lane model, the system may compute two outer edges of each level on the y-axis with the level mean and the average width of the tlanes in the level in step 720 of method 700. Thus, the system may determine the EH of each eye with the distance between the upper and lower edges of the adjacent levels of an eye in step 730 of method 700. Then, the system may determine the EW of the eye with the min EH in step 740 of method 700. After that, the system may locate the x center of the eye diagram with ½ of the EW to get the max EW in step 750 of method 700 and reset the y-axis to the new x center to obtain the max EW of the eye in the PAMn eye diagram in step 760 of method 700.

Figure 8:
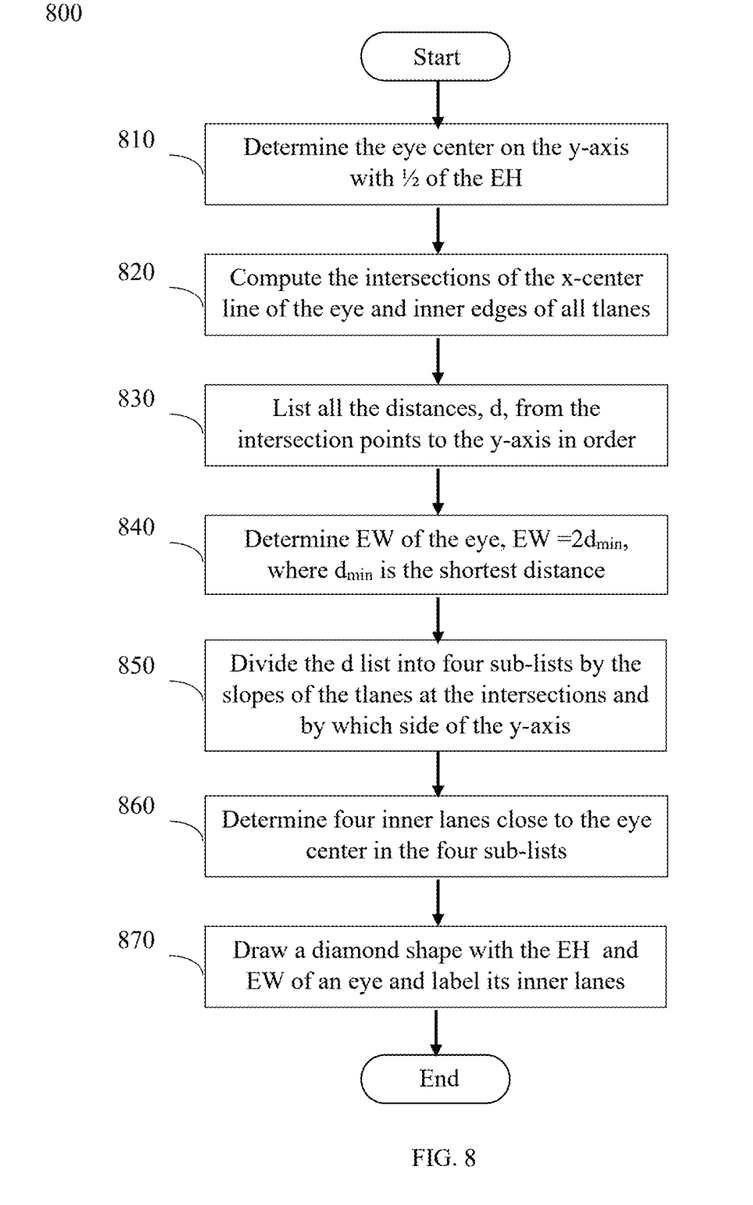
FIG. 8 illustrates a flow chart of an exemplary method for determining the EW and the inner lanes of an eye, which has the known EH in the PAMn eye diagram, in accordance with an embodiment of the present invention.

FIG. 8 illustrates a flow chart of an exemplary method for determining the EW and the inner lanes of an eye, which has the known EH in the PAMn eye diagram, in accordance with an embodiment of the present invention. The system may first determine the center of the eye on the y-axis with ½ of the EH to get a horizontal center line in step 810 of method 800. Then, the system may compute the intersections of the horizontal line of the eye and the inner edges of all tlanes in step 820 of method 800. The system may use trigonometric functions and the mean and width of each tlane to calculate the inner edge of the tlane at the cross point. By listing the distances d from the intersection points to the y-axis in order in step 830 of method 800, the system may find the shortest distance, $d_{min}$, so that the EW of the eye is EW=$2d_{min}$ in step 840 of method 800. Furthermore, the system may divide the d list into four sub-lists by the slopes of the tlanes at the intersections and by which side on the y-axis in step 850 of method 800 and determine four inner lanes of the eye close to the eye center in the four sub-lists in step 860 of method 800. Finally, the system may draw a diamond shape with the eye's EH and EW and label the diamond's four sides with the associated tlanes in step 870 of method 800.

Figure 9:
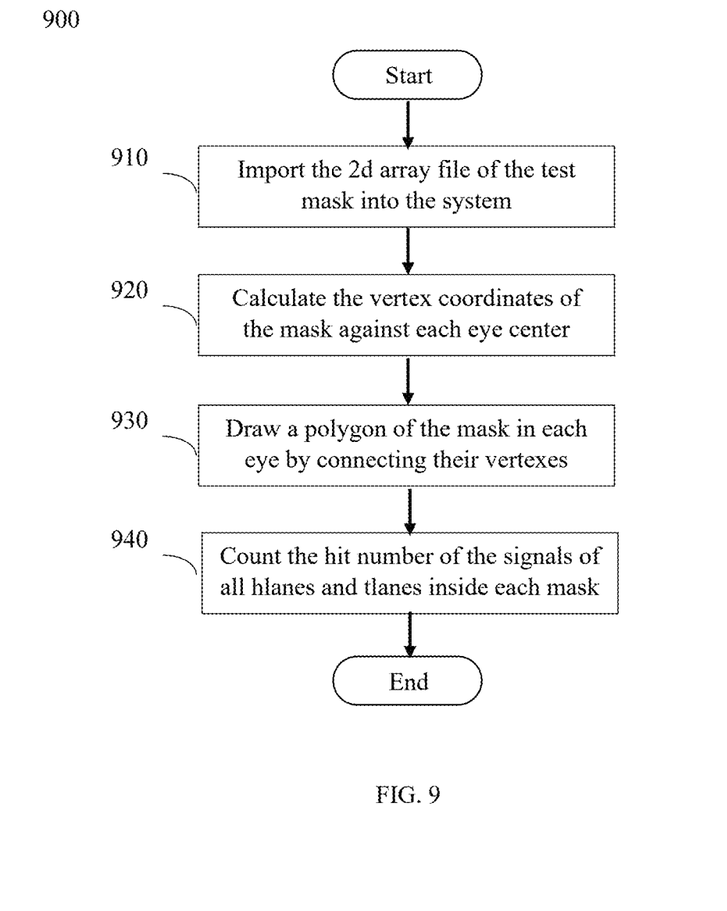
FIG. 9 illustrates a flow chart of an exemplary method for performing the mask testing of the PAMn eye diagram, in accordance with an embodiment of the present invention.

FIG. 9 illustrates a flow chart of an exemplary method for performing the mask testing of the PAMn eye diagram, in accordance with an embodiment of the present invention. The critical point to performing the mask testing in the PAMn eye diagram is to locate the mask at each eye center. The system may import a 2d array file of a test mask in step 910 of method 900 and then calculate the vertex coordinates of the mask against each eye center in the PAMn eye diagram in step 920 of method 900. Thus, the system may draw a polygon of the mask by connecting the vertexes of the mask in each eye in step 930 of method 900. Finally, the system may run a test of the 2UI PAMn eye diagram again and count the hit number of the signal points of all hlanes and tlanes inside each mask in step 940 of method 900.

Figure 10:
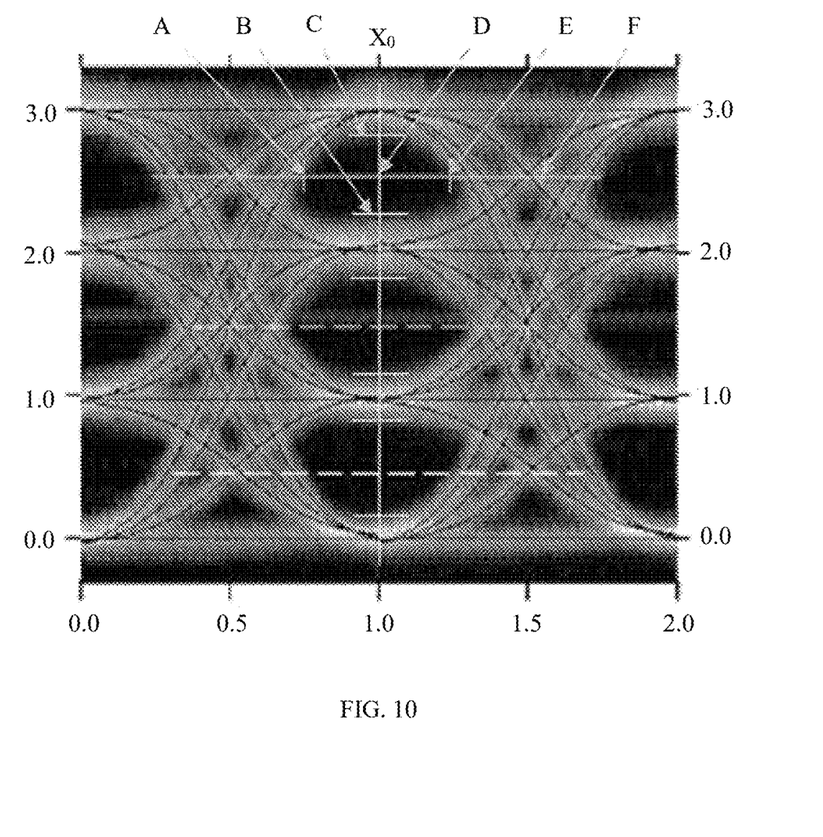
FIG. 10 illustrates an example of determining the EH of eyes and the x center of the PAM4 eye diagram.

FIG. 10 illustrates an example of determining the eyes' EH and the x center of the PAM4 eye diagram. The y-axis at x0 is the initial central axis of the PAM4 eye diagram. The system may compute two outer edges of each level on the y-axis to get the EH of the eyes to determine the EH of all eyes and the eye with the min EH. For instance, the top eye has the minimum EH among the eyes, whose EH is the distance between the upper edge C and bottom edge B of the eye. Then, the system may determine the horizontal center D of the top eye with ½ of the EH. By finding the intersections A and E of the horizontal line F and the inner edges of two inner lanes (03) and (30), the system may determine the EW of the top eye by the distance between points A and E. After that the system may locate the x center of the top eye at ½ of the EW. Finally, the system may reset the y-axis to the new center of the PAM4 eye diagram to determine the EW of other eyes.

Figure 11:
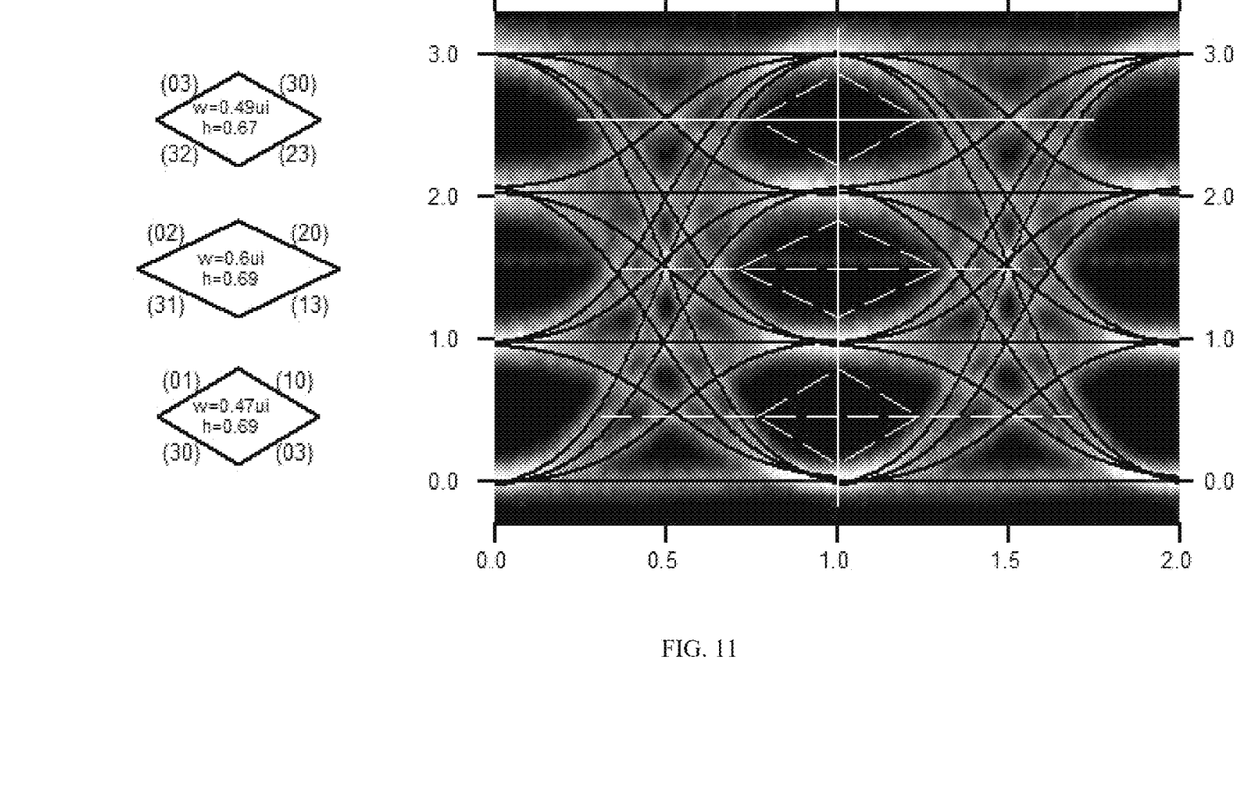
FIG. 11 illustrates an example of drawing a diamond shape with the EH and EW of an eye and labeling each side of the diamond with the associated inner lane after characterizing the PAM4 eye diagram.

FIG. 11 illustrates an example of drawing a diamond shape with the EH and EW of an eye and labeling each side of the diamond with the associated inner lanes after characterizing the PAM4 eye diagram. The system may print the EH and EW inside or outside the diamond, depending on the space in the diamond. As a helpful tool, the diamond drawing allows engineers to intuitively analyze the impacts of the critical elements in the eye shape and quickly find changes in each eye in the PAMn eye diagram on a high-speed series data link.

Figure 12:
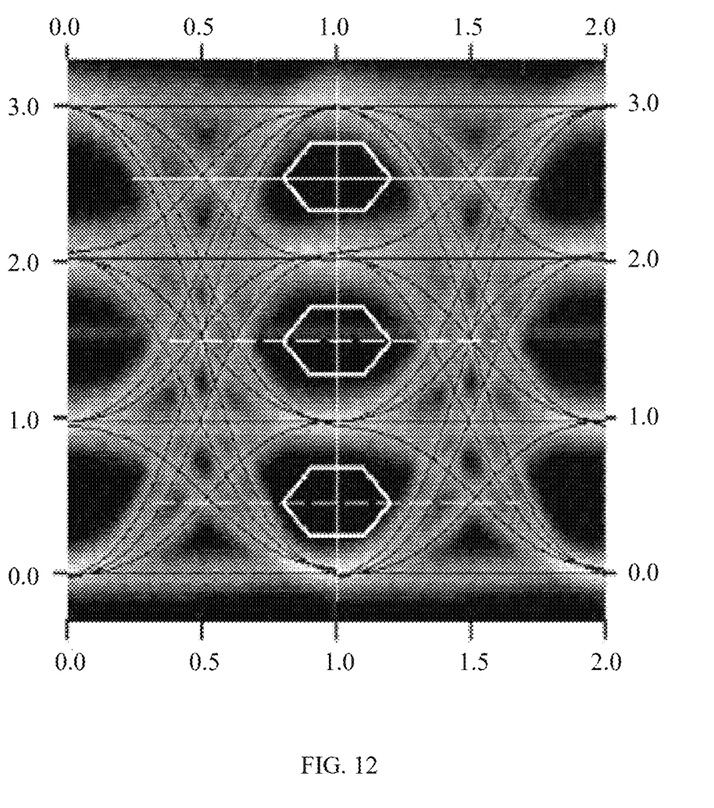
FIG. 12 illustrates an example of locating the masks against the center of each eye and performing the mask testing of the PAM4 eye diagram.

FIG. 12 illustrates an example of locating the masks against the center of each eye and performing the mask testing of the PAM4 eye diagram. By importing a 2d array file of the mask, the system may calculate the vertex coordinates of the mask against each eye center, draw a polygon of the mask in each eye by connecting their vertexes, and count the hit number of the signals of all hlane and tlanes inside each mask.

The invention claimed is:

1. A method comprising the steps for:
   importing a photo or a digital file of a multi-level Pulse Amplitude Modulation (PAMn) eye diagram;
   editing the PAMn eye diagram as a one unit interval (1UI) PAMn pattern with the image processing method;
   sampling and determining a horizontal lane (hlane) and level data for each level histogram in the 1UI PAMn pattern;
   sampling and fitting a center curve for each transition lane (tlane), and determining a tlane mean and width, in the 1UI PAMn pattern;
   saving all testing and statistical data in the 1UI PAMn pattern to a file;
   generating a two unit interval (2UI) PAMn eye diagram by combining two 1UI PAMn pattern;
   determining an eye height (EH) for each eye and setting the x-coordinate of the vertical center axis (y-axis) of the 2UI PAMn eye diagram;
   determining an eye width (EW) and identifying inner lanes of for each eye with the determined EH;
   performing a mask testing for all eyes in the 2UI PAMn eye diagram;
   visualizing and reporting test parameters for each eyes in the 2UI PAMn eye diagram.

2. The method of claim 1, in which said steps of sampling and fitting a center curve for each tlane and determining a tlane mean and width, in the 1UI PAMn pattern:
   selecting a tlane in the 1UI PAMn pattern to test;
   selecting a fitting function and a pixel threshold;
   sampling ordinary points along the center curve of the tlane by left-clicking a mouse;
   sampling a midpoint of the tlane by right-clicking the mouse;
   fitting and drawing the tlane center curve in the 1UI PAMn pattern using the selected fitting function;
   determining the tlane mean and width from the pixel profile of the cross-section at the midpoint using Gaussian fitting.

3. The method of claim 1, in which said steps of determining an eye height (EH) for each eye and setting x-coordinate of the vertical center axis (y-axis) of the 2UI PAMn eye diagram:
   selecting a y-axis close to an eye center as an initial center axis in the 2UI PAMn eye diagram;
   computing two outer edges for each level on the y-axis by a level mean and an average width of the tlanes;
   determining an eye height (EH) of each eye with a distance between an eye's upper edge and lower edge;
   determining an eye width (EW) of the eye with a minimum EH;
   locating a x-center of the eye diagram with ½ of the determined EW to obtain a max EW;
   resetting the y-axis to the new x-center of the 2UI PAMn eye diagram.

4. The method of claim 3, in which said steps of determining the EW of the eye with a minimum EH:
   determining the eye center on the y-axis with ½ of the EH;
   computing intersections points of the x center line of the eye and inner edges of all tlanes;
   listing the distances, d, from the intersection points to the y-axis in order;
   dividing the d list distances into two sub-lists by which side on the y-axis;
   determining two inner lanes close to the eye center in the two sub-lists;
   determining EW of the eye, $EW = d1 + d2$ where $d1$ and $d2$ are distances of the two inner lanes.

5. The method of claim 1, in which said steps of determining eye width (EW) and the inner lanes of each eye with the determined EH:
   determining the center of the eye on the y-axis with ½ of the EH;
   computing the intersections of the x center line of the eye and the inner edges of all tlanes;
   listing the distances, d, from the intersection points to the y-axis in order;
   determining EW of the eye, $EW = 2d_{min}$ where $d_{min}$ is the shortest distance;
   dividing the d list into four sub-lists by the slopes of tlanes at the intersection and by which side on the y-axis;
   determining four inner lanes close to the eye center in the four sub-lists;
   drawing a diamond shape with the EH and EW of the eye and labeling the four sides of the diamond with the associated tlanes.

6. The method of claim 1, in which said steps of performing a mask testing on all eyes in the 2UI PAMn eye diagram:
   importing a 2d array file of the test mask into the system;
   calculating vertex coordinates of the mask against each eye center in the 2UI PAMn eye diagram;
   drawing a polygon of the mask in each eye by connecting their vertexes;
   running a test of the 2UI PAMn eye diagram again and counting a hit number of the signals of all hlane and tlanes inside each mask.

* * * * *